Patented July 9, 1946

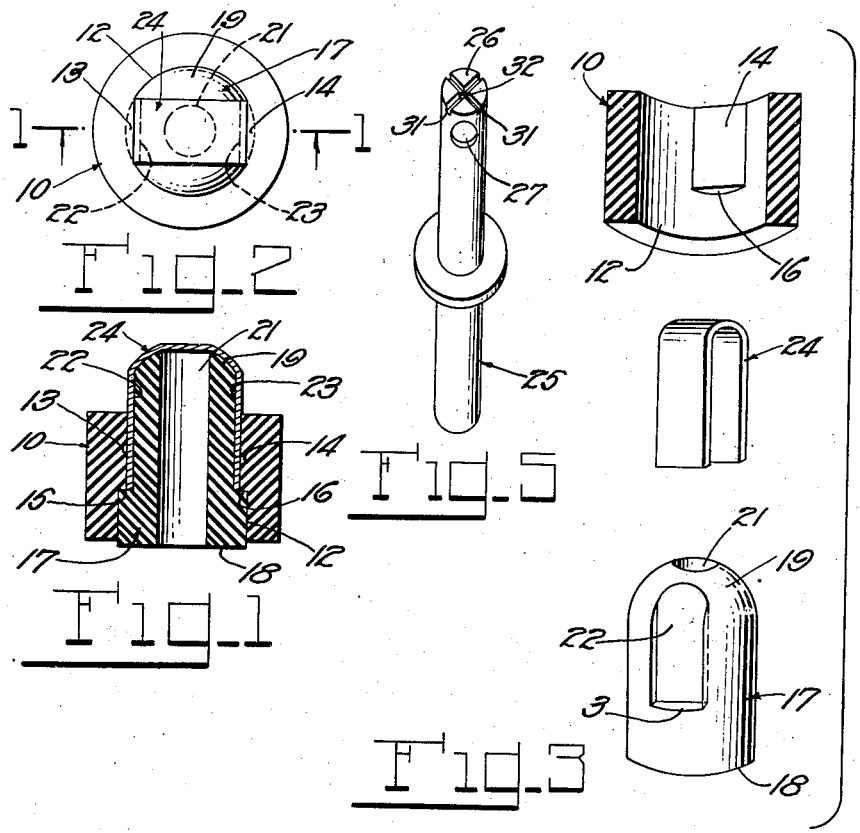
July 9, 1946.      L. W. ISOM ET AL      2,403,801
BALLOON VALVE
Filed April 27, 1943
Inventors:
LANGLEY W ISOM AND
EMILE E. HABIB
By Theodore C. Browne
Attorney.

2,403,801

UNITED STATES PATENT OFFICE 2,403,801

BALLOON VALVE

Langley W. Isom, Belmont, and Emile E. Habib, Arlington, Mass., assignors to Dewey and Almy Chemical Company, North Cambridge, Mass., a corporation of Massachusetts Application April 27, 1943, Serial No. 484,740

2 Claims. (Cl. 251—115)

This invention relates to balloons and valves for balloons. Relatively small balloons have come into wide military use to support antennas for radio equipment, others must fly free at constant levels. Since, in field service the source of hydrogen cannot be derived from a tank, it is usually derived from portable generators which liberate hydrogen by chemical action. The design of a valve which will prevent the escape of hydrogen at the very low inflation pressures necessary has presented numerous difficulties.

In the first place, passageway through the valve and through the inflation tube must be large, otherwise a substantial back pressure will be built up in the hydrogen generator and, because field generators are simple and are not well provided with traps for foam or debris, the valve must be able to seal off the hydrogen after inflation even though some lime or other chemical reaction product is carried into the valve along with the flow of gas.

The production of a suitable valve and the design of a cooperating inflation nozzle which cannot seize or tear the valve flap are objects of our invention. These and other objects of the invention will become apparent from the specification and from the drawing, in which Figure 1 is a vertical sectional view taken on the line 1—1 of Figure 2;

Figure 2 is a top plan view;

Figure 3 is an exploded view showing the component parts of the valve;

Figure 4 is a sectional view showing the valve in place in a balloon envelope with the inflation nozzle inserted; and Figure 5 is a perspective view of the inflation nozzle.

The valve comprises a ring 10, Figure 1, which is fixed in the neck 11 of the balloon usually by means of cement and a lashing 1 as shown in Figure 4. The bore 12 of the ring carries two wedge-shaped projections 13 and 14 molded in its wall. These do not extend throughout the whole length of the bore but end at the shoulders 15 and 16, as shown in Figure 3. The valve proper comprises a cylindrical plug 17 having a flat base 18 and a hemispherical head 19 and is provided with an axial bore 21. The cylindrical shape of the plug is modified at 22 and 23 by recesses shaped to receive the projections 13 and 14. The valve flap 24 is formed from a U-shaped elastic band, the ends of which are cemented in the recesses 22 and 23 and which is pulled under tension against the hemispherical head 19 of the plug 17 in such a manner that it closes off the bore 21. When the bases 3 of the recesses 22 and 23 lie against the shoulders 15 and 16, the ends of the flap 24 are tightly wedged between the ring and the plug. In addition to acting as wedges to hold the valve flap in place, the mating relationship of the recesses and the projections prevents the plug 17 from turning in the ring 10 when the inflation nozzle is twisted and pushed through the bore 21.

The inflation nozzle 25 has a flat head 26 chamfered at its margins and bears ports 27 and 28 drilled through its cylindrical wall adjacent the head and communicating with its bore 29. Cross kerfs 31—31 are cut across the head 26 and a small port 32 located at their intersection communicates with the bore 29.

To inflate the balloon, the nozzle 25 is attached to a gas generator (not shown) and is pushed into the bore 21 of the valve. When pushed home, the ports 27 and 28 lie above the hemispherical portion 19 of the plug 17 and valve flap 24 is pushed into a sharply conical shape and raised from engagement with the portion 19, allowing gas to enter the envelope. As the nozzle is withdrawn, the edges of the valve flap 24 come into contact with the hemispherical portion 19 first immediately adjacent the walls of the bore 21 and then, as the flap contracts further, its edges slide further down the hemispherical portion 19 of the plug 17. The wiping action in the closing of the valve sweeps away any particles of lime or foam which may have been blown into the valve by the generator and assures a hydrogen-tight seal under all conditions. At the time that the nozzle is withdrawn, the kerfs 31, and port 32 prevent the nozzle head 26, and the valve flap 24 from adhering by suction, which otherwise might draw the valve flap into the bore or displace it from proper seating.

The valve itself is simple and self-cleaning since it sweeps lime particles and slime away from the valve seat on closing and it maintains a tight seal with very low inflation pressures.

We claim:

1. A nozzle for inflating balloons having means to prevent seizing and displacement of the valve elements upon the withdrawal of the nozzle comprising a closed end tube having inflating ports adjacent its closed end communicating with its bore, kerfs formed across the closed end of said tube and a port of a smaller diameter than the bore providing a passage between the kerfs and the bore of said tube.

2. A valve for inflating balloons comprising a ring having wedging projections on its inner wall, a plug having an axial bore adapted to be inserted in the ring and bearing cooperating wedging surfaces on its outer walls, and a resilient valve flap stretched over one end of said bore and having its ends secured between the wedging projections of the ring and the wedging surfaces of the plug, thereby maintaining said flap under tension to normally close the axial bore of said plug.

LANGLEY W. ISOM.
EMILE E. HABIB.